United States Patent
Lamon

Patent Number: 5,513,462
Date of Patent: May 7, 1996

[54] METHOD FOR HARVESTING BRINE SHRIMP CYSTS

[75] Inventor: Mark S. Lamon, Hayward, Calif.

[73] Assignee: Ocean Star International, Inc., Snowville, Utah

[21] Appl. No.: 347,035

[22] Filed: Nov. 30, 1994

[51] Int. Cl.$^6$ .......................... A01K 61/00; A01K 79/00
[52] U.S. Cl. ................................. 43/6.5; 43/4.5; 210/776
[58] Field of Search .................... 43/4.5, 6.5, 8; 56/8, 9; 119/205, 213; 210/776, 923, 242.1, 242.3, 384, 335

[56] References Cited

U.S. PATENT DOCUMENTS

| | | | |
|---|---|---|---|
| 4,116,007 | 9/1978 | Stagemeyer et al. | 210/242.3 X |
| 4,146,477 | 3/1979 | Challener | 210/143 |
| 4,388,188 | 6/1983 | Morris | 210/242.3 |
| 4,839,062 | 6/1989 | Sanders | 119/205 X |
| 4,998,369 | 3/1991 | Lamon | 43/6.5 |
| 5,002,430 | 3/1991 | Smith | 210/242.3 X |
| 5,042,187 | 8/1991 | Bentzley | 43/6.5 |
| 5,215,654 | 6/1993 | Karterman | 210/923 X |

Primary Examiner—Richard K. Seidel
Assistant Examiner—Jeanne M. Elpel
Attorney, Agent, or Firm—A. Ray Osburn

[57] ABSTRACT

Method for harvesting of brine shrimp eggs (cysts) from bodies of salt water. A floating collection boat is used with a very long floating boom, which is first deployed across the paths of wind blown individual colonies. Numerous colonies are quickly intercepted, and enclosed by upwind circling of the boom. With subsequent constriction of the enclosure, the cysts are consentrated into a thick slurry at the collection boat.

10 Claims, 5 Drawing Sheets

METHOD FOR HARVESTING BRINE SHRIMP CYSTS

BACKGROUND OF THE INVENTION

1. Field

The field of the invention is the harvesting of brine shrimp cysts from bodies of highly salt concentrated water, such as found in the Great Salt Lake.

2. State of the Art

Brine shrimp eggs are contained within protective spherical cysts which, in the species of concern, float in dense concentrated brine. The cysts exist in huge numbers and have in fact been harvested from shoreline deposits. However, this method of harvest typically results in the inclusion of much debris and foreign material, including sand and the like. This material must subsequently be removed by washing and other procedures at considerable expense before the cysts are in condition for shipment. Shrimp eggs are ultimately caused to hatch and develop into the shrimp, which are then utilized as food for use in shrimp farms and the like producing food for human consumption. More recently, a great deal of interest has developed in harvesting the shrimp cysts distantly from shore to avoid the contamination from foreign material. The cysts inhabit the top fraction of an inch of the surface of the salt water. They may be harvested as by manual net dipping, utilizing 120 mesh material and the like. Such harvesting methods are practical, but are undesirably labor intensive. Accordingly, other devices have been conceived based upon pumping the cyst rich top layer of water into porous cloth bags or the like, with the brine subsequently draining away and leaving the cysts within the bags. However, the direct pumping of the surface layer appears to be impractical because the available pumping apparatus ingests far too much water along with the cysts, making the bag straining procedure unduly time consuming and inefficient. Accordingly, devices have been conceived and used which attempt to efficiently concentrate the cysts within the brine before pumping into the final receptacle bags. One such device is disclosed in U.S. Pat. No. 4,839,062, being a raft-supported cyst collection device in a funnel configuration. The funnel is submerged in the water so that a portion of its leading upper edge is below the cyst-containing layer of water. The device then depends upon forward motion of the raft to ingest the cyst-containing layer of water, hopefully concentrated sufficiently to be a slurry. The funnel outlet is connected to a hose and pump system to move the slurry from the funnel into the final cyst collection bags. The success or efficiency of the system depends upon maintenance of the funnel level, which is done by a crank and screw device which adjusts the entire funnel in elevation. This adjustment must be constantly changed because of swells, either occurring from wind or from the forward motion of the raft. A somewhat improved device is found in U.S. Pat. No. 4,998,369, which includes a similarly shaped funnel collection device which has however a forward movable edge which can be adjusted in elevation to allow the shrimp laden layer to flow inwardly to the pit of the funnel. No forward motion is needed with this device to make initial collection of the floating cysts. This patent also discloses various onboard means associated with the cyst collection pontoon boat, to concentrate the cyst containing salt water to some extent. These devices include a pressurized system wherein pressure is used to force greater amounts of the salt water from the cysts at an intermediate point in their pumped transfer from the sump to the eventual cyst collection bags. However, further shore based cleaning and dewatering of the salt water is required, using fresh water, before final drying of the cysts into the form suitable for containerizing. In U.S. Pat. No. 5,042,187, a floating boom is placed to form an enclosure around a floating shrimp egg colony to be harvested. An associated pontoon boat is fitted with manually cranked roller arrangements to reel the boom toward the boat, shrinking the enclosure and concentrating the shrimp cysts within the upper inches of water. Instead of a sump and an associated slurry pump, as used in previously discussed patented devices, the concentrated slurry is dipped from the water by conveyor mounted screens of porous material, to dewater the collected cyst slurry to some degree before depositing it into water porous collection bags. The conveyor mounted sieves retain substantially all foreign matter, which must be removed in a later operation. With this procedure, the boom is used to encircle individual floating colonies of brine shrimp; the harvester boat must frequently move from one such colony to another to amass a significant harvest. Typically, the individual colonies of cysts are wind blown and scattered about the surface of the water.

Clearly, a need continues to exist for improved apparatus and methods for offshore harvesting of brine shrimp cysts which does not require constant movement of the harvester vessel about the body of water, but permits the harvest of widely dispersed floating cyst colonies from the vessel anchored in a single location.

BRIEF SUMMARY OF THE INVENTION

With the foregoing in mind, the shortcomings and disadvantages of prior art devices and methods for offshore harvesting of brine shrimp cysts are eliminated or substantially alleviated by the present inventive apparatus and method. A cyst collecting vessel, generally a pontoon supported motorized raft, is positioned upon the body of water in the general vicinity of floating cysts, which are generally found in separate colonies. The vessel carries diaphragm pumps and associated hosing to deposit concentrated cyst containing slurry into large water porous but cyst impermeable bags carried on the boat deck. The slurry is pumped into the bags from a floating funnel shaped, slurry collection receptacle having a pumping pit into which concentrated slurry is deposited through a foremost opening positioned a few inches below the surface of the water. Advantageously, the collection box has converging vertical sides directing the slurry to the entrance opening in the pumping sump.

The cyst harvesting method utilizes a flexible floating boom which is a few hundred to several hundred feet in length. The boom type generally used to contain floating oil spills may be employed. The elongate boom is secured near one of its ends beside the entrance to a slurry collection receptacle, which is in turn secured to a specialized, pontoon supported, vessel. The elongate boom is deployed away from the harvester boat perpendicularly to the prevailing wind, and thus across the paths of the wind blown cyst colonies. It is anchored in this position and left to collect along its length sufficient colonies for a significant harvest. The end distant from the harvester boat is then towed, up wind of the cysts, back to the harvester boat, enclosing many cyst colonies together within a floating loop of boom. The cysts are then concentrated into a thick floating slurry at the collection box opening by progressively shortening the encircling portion of the boom, by driving it through a crank operated boom retrieval device. This procedure assures that slurry with minimum water content is pumped to the deck mounted collection bags. More importantly, it permits the harvest of very large quantities of cysts from a single anchored location of the collection vessel, avoiding the inefficient and time consuming pursuit, and concentration, of individual colonies.

The inventive method may also be exercised using only the harvester boat, by bottom anchoring one end of the boom, then deploring it using the harvester boat, which is subsequently maneuvered back to the bottom anchoring point, enclosing the cyst colonies in a loop for collection as described above.

After collection into the deck carried bags, it is advantageous to preliminarily clean the cysts of feathers and other debris and odoriferous hatched dead shrimp. This is done by a brine water wash, flushing the slurry from the bags through a relatively coarse screen to a water permeable but cyst retaining 120 mesh cloth, and thence to another bag for transporting to a fresh water washing and drying facility, such as that described in U.S. Pat. No. 5,088,210.

It is therefore the principal object of the invention to provide a more efficient cyst harvesting apparatus and method for brine shrimp cysts.

BRIEF DESCRIPTION OF THE DRAWINGS

In the drawings, which represent the best modes presently contemplated for carrying out the invention, FIG. 1 diagrammatically indicates the placement of the elongate boom across the path of wind blown cyst colonies, FIG. 2 indicates the encircling towing of the far end of the boom about the cyst colonies, FIG. 3 a perspective view showing the entrance portion of the cyst collection receptacle with slurry being deposited thereinto, with a portion of the slurry cut away to expose internal details of the receptacle, drawn to a reduced scale, FIG. 4 a perspective view of the harvester boat with the attached cyst receptacle, and the capturing boom pulled through to form a small enclosure around concentrated cyst slurry at the entrance to the receptacle, drawn to a smaller scale than FIG. 3, and FIG. 5 a cross sectional view of the salt water preliminary screening facility for the collected bags of cysts, drawn to a reduced, but larger, scale than FIG. 4.

DETAILED DESCRIPTION OF ILLUSTRATED EMBODIMENTS

Figure 1:
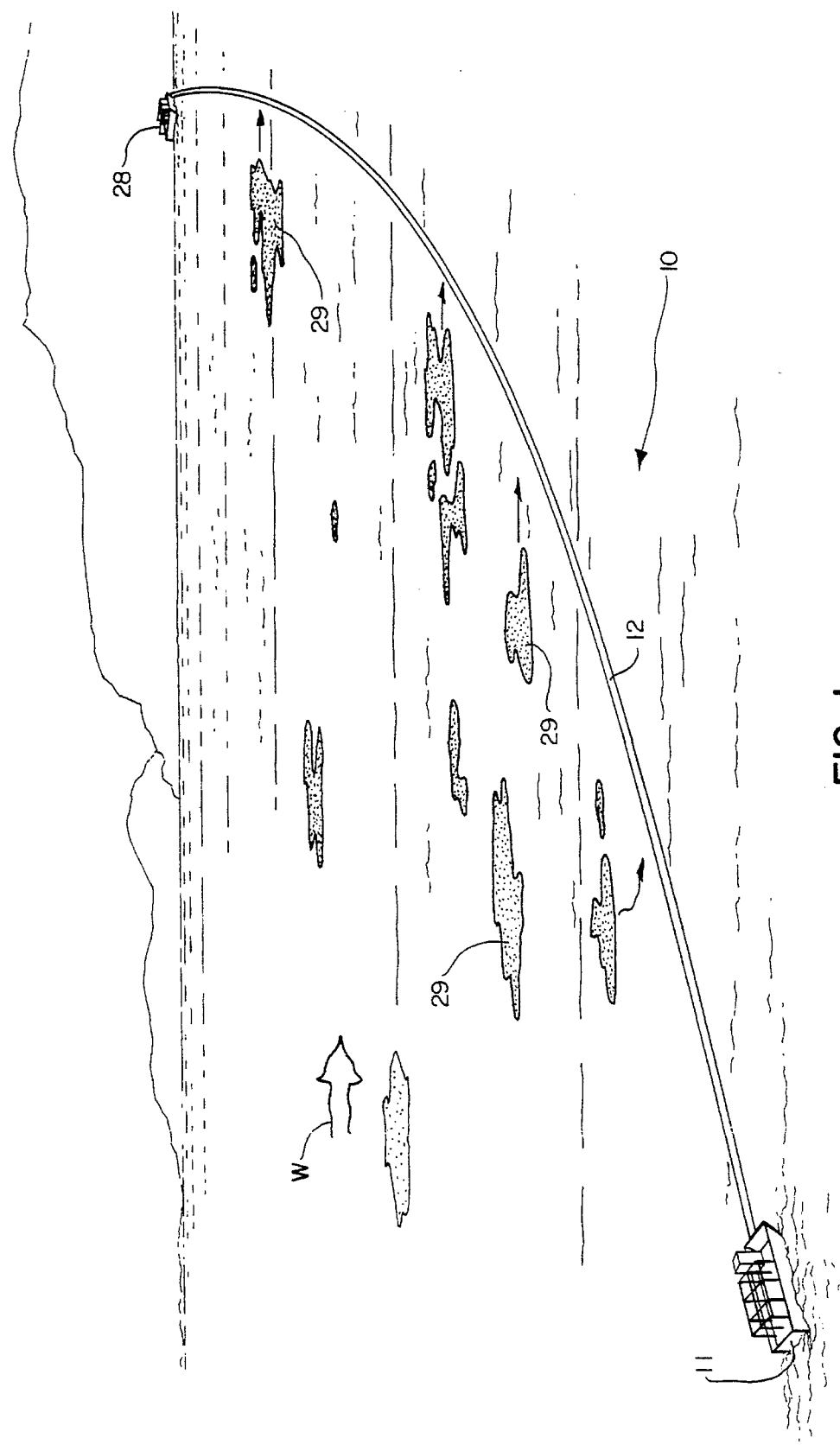
Figure 3:
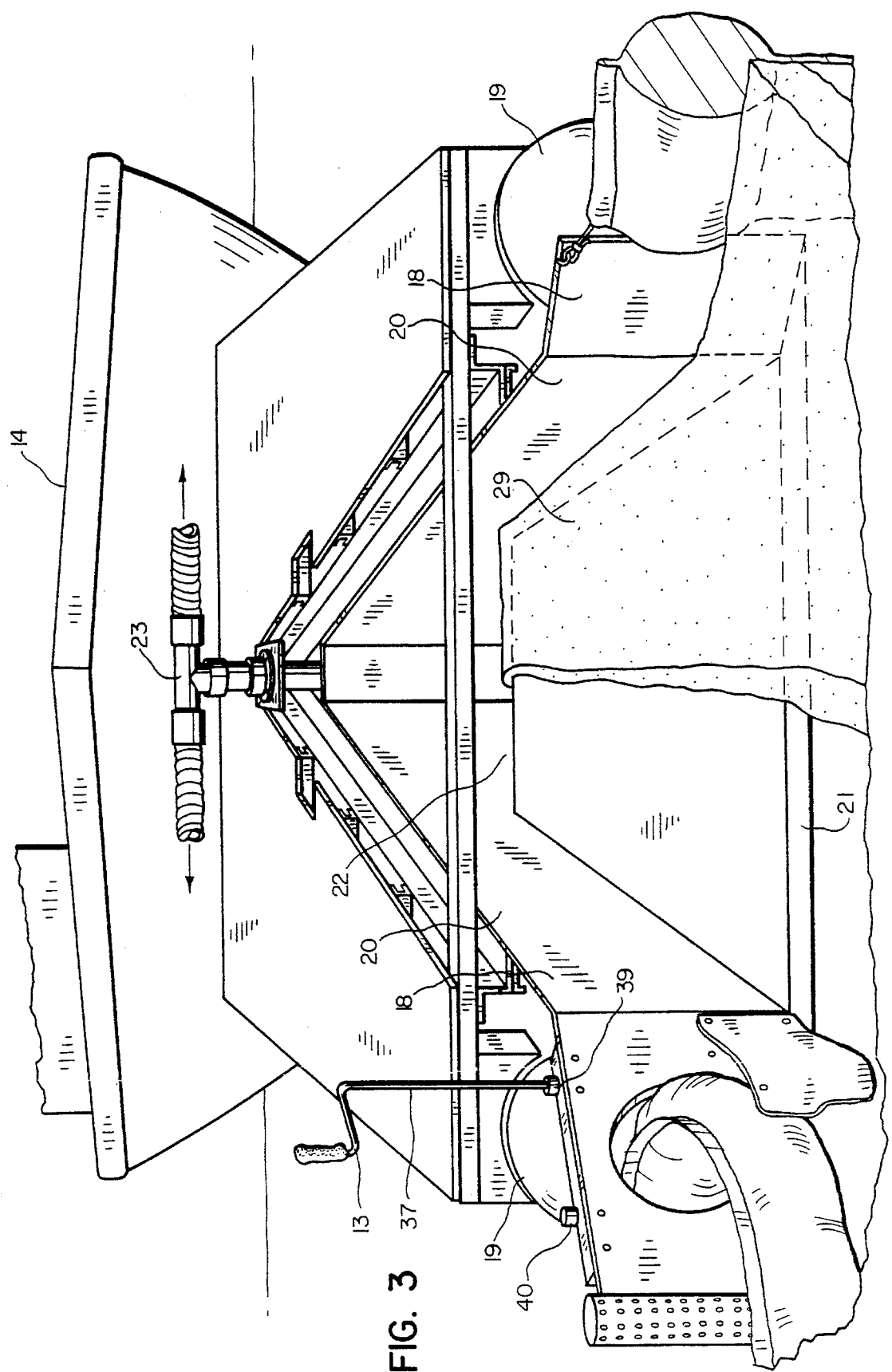
Figure 4:
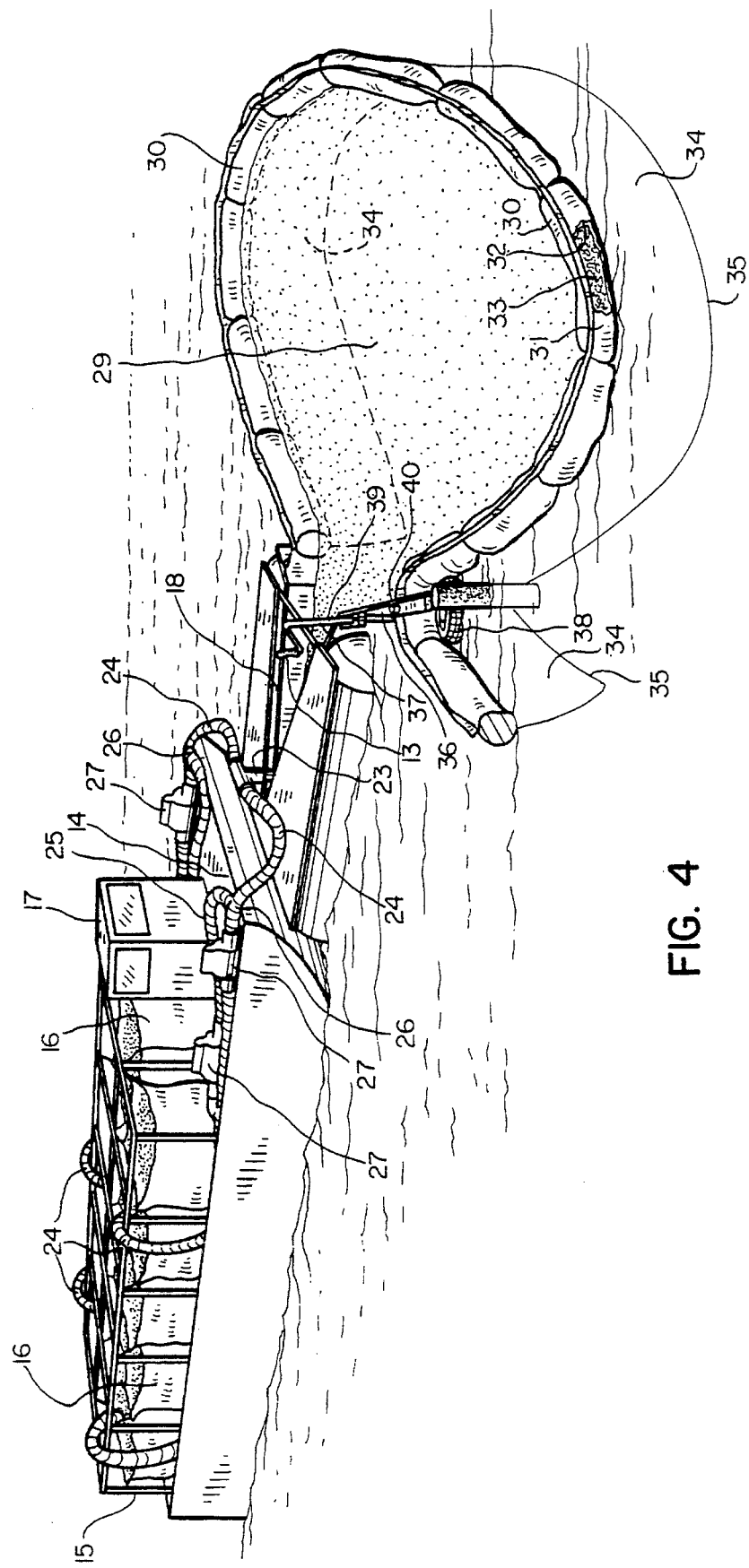
Figure 5:
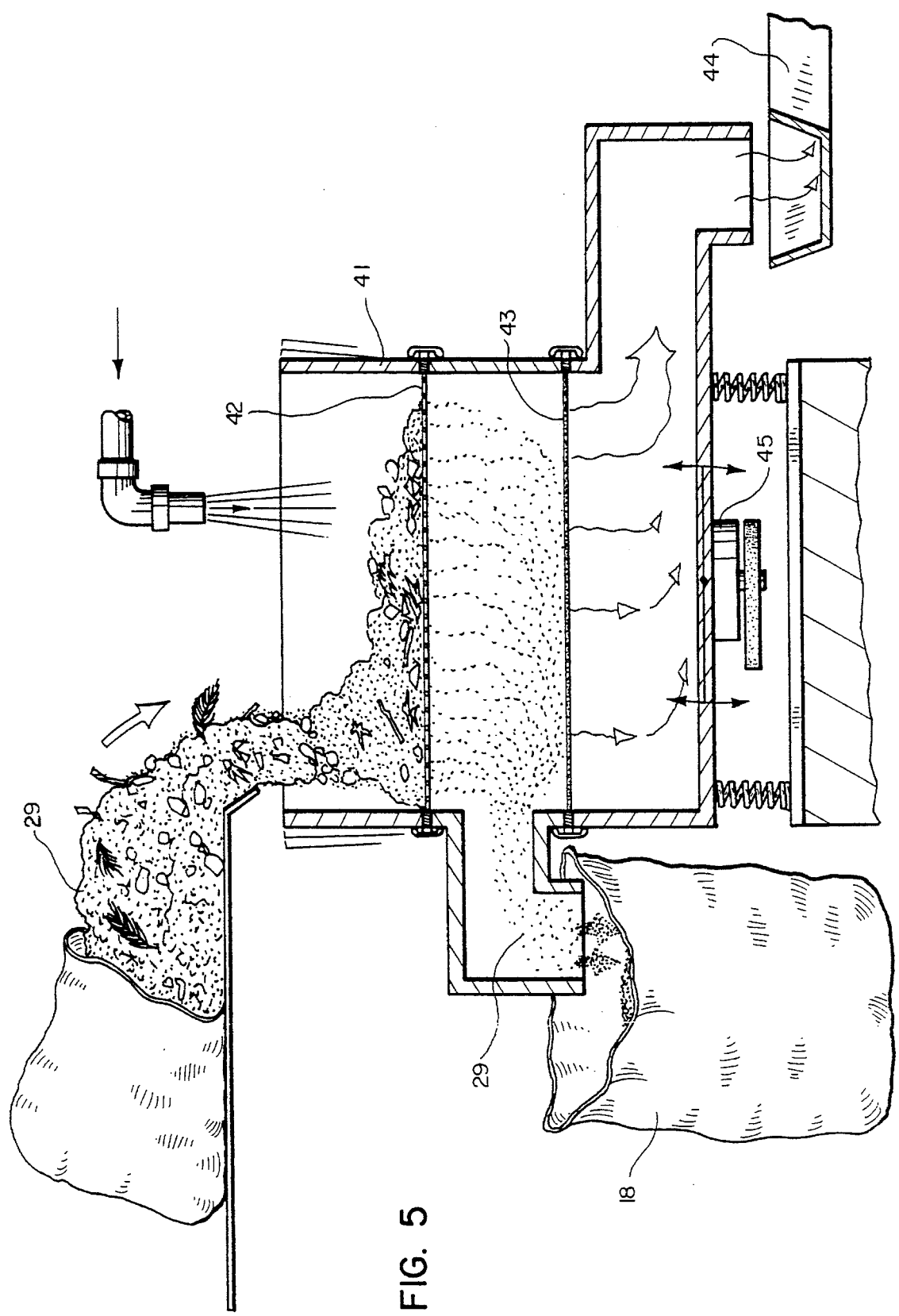

An assembly 10, in accordance with the invention, for offshore capture of floating shrimp cysts (eggs) from surface layers of salt laden water is seen in FIG. 1, and comprises a specialized shrimp harvesting pontoon boat 11 in combination with an elongate floating boom assembly 12 and a boat mounted boom retracting device 13 in FIGS. 3 and 4. Boat 11 comprises a deck structure 14 with supporting stanchions 15 for porous water permeable bags 16 into which a collected slurry of shrimp cysts are deposited as described below. Typically, boat 11 is about 12 feet wide and 50 feet long. In the illustrated embodiment, deck space for 18 bags 16 is provided. Each bag is approximately 3 feet in diameter and 4 feet in height. Each bag 16 laden with water filled shrimp cyst slurry, weighs approximately one ton, so that the boat must be sized and powered accordingly. Three propeller engines of about 300 hp each renders boat 11 capable of about 15–20 mph when all bags are fully loaded. The motors are operated from a control cab 17 mounted upon the deck 14.

A cyst collection chamber 18 is installed connected to boat 11 at its forward end, and carries its own shortened pontoons 19 rendering it dependent buoyant from the main boat 11. Cyst receptacle 18 has a pair of rearwardly converging vertical side members 20 joined by a cross weir 21 submerged a few inches below the water surface. A pumping pit 22 provided downwardly and rearwardly of the weir incorporates a pump hose connector 23, "T" shaped to accommodate a pair of 4" diameter hoses 24. Each of the hoses 24 is preferably joined with a further hose 25 at a "Y" juncture 26. With this arrangement, each branch of hose 24 can be used to provide slurry to a pair of pumps 27 to force the thick slurry into the bags 18 on deck 14. It is desirable that the slurry be as thick as possible, with minimum water content and maximum cyst content. This avoids time delays for the dewatering through the bags, which would otherwise be necessary for efficient filling. The desired concentrated thick slurry results from the method of collecting the shrimp cysts from the surface layer of water.

The floating boom assembly 12, which may be of a type often used to contain oil spills upon ocean water surfaces, is adapted for cyst harvesting. For efficiency in such harvesting, the boom assembly must be at least a few to several hundred in length, with lengths of 500 to 1,000 feet being not unusual. The cysts exist in colonies in the uppermost layer of the water and are pushed and scattered about the surface by prevailing winds w. The harvester boat 11 is unwieldy, slow, and not very maneuverable, so that it is inefficiently time consuming for it to chase individual colonies about the water for collection. One prior art method described as "skimming" requires constant slow forward motion of the collector boat into a floating shrimp cyst colony. With this method, it is difficult to collect other than very dilute slurry containing much excess water which must be slowly removed by bag drainage or other onboard methods. This greatly slows the harvesting. With another method, an individual colony, once it is located and the boat moved to its vicinity, may be surrounded by a short boom assembly, which is then drawn together to concentrate the slurry at the receptacle entrance. Thus, many such colonies are required for a significant harvest, so that the boat must be repeatedly moved and maneuvered onto the next, consuming time very inefficiently.

Figure 2:
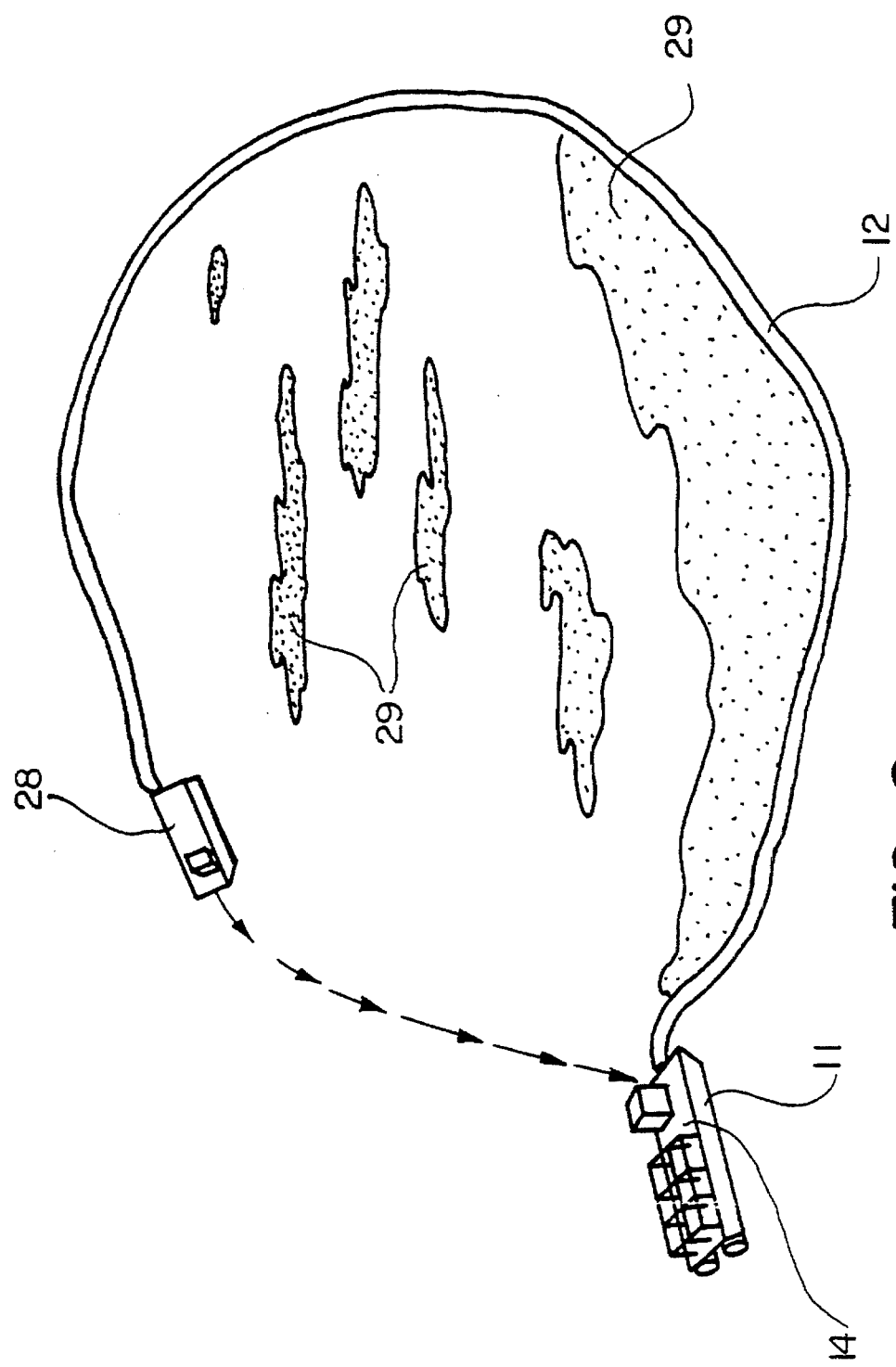

In accordance with the present invention, therefore, the above described elongate boom 12 is extended from the boat simultaneously across the paths of many wind driven individual cyst colonies and anchored in place, its near end to the collect boat 11 and the far end to the bottom of the body of water, or to a smaller faster attendant boat 28. (FIGS. 1 and 2) Boat assembly 12 is left anchored upon the surface of the water for a period of time to allow the colonies pushed by the wind w to be intercepted and to amass on its upwind side. Its far end is then drawn in a large upwind arc back to the boat, encircling the numerous intercepted colonies 29 of cysts all at once. The anchored position of boom 12 is seen in FIG. 1, and the encircling maneuver indicated in FIG. 2.

The encircling maneuver gently moves the colonies 29 together to merge near receptacle 18. The cysts from the combined colonies occupy a few inches of the surface layers of the water in thick concentration. The boom 12 may at time be more advantageously be towed from an intermediate point resulting in at least the momentary creation of a large FIG. 9 upon the surface of the water.

Once boom 12 is reattached at its opposite side of receptacle 18, the cyst encircling boom portion is further shortened by a boom pull assembly 36 operated by a crank 37. Boom puller 36 further comprises a pair of pneumatic tire wheels 38 journaled to rotate about vertical spindles 39 and 40. (FIGS. 3 and 4) At their circumference, the pair of wheels make rolling contact together when the attached crank 37 is turned, the tires grip the downwardly suspended sheet 34 enabling the boom to be pulled through the device without damage to the floats 31. The entrapped cysts from the several colonies, now a deep, several inches thick, slurry are urged toward an over weir 21, and thence into pumping pit 22. From pit 22, the thick slurry is transferred by the pumps 27 to the bags 18 upon the deck 14.

If no attendant boat 28 is available, the harvesting apparatus 10 may still be used, albeit somewhat less efficiently. In this event, boom assembly 12 is bottom anchored at one end and paid out from boat 11 across the path of the wind blown cyst colonies. After cyst colony accumulation against boom 12, harvester boat 11 must, with this method, loop upwind back to the end anchor. Thence, the collection proceeds as described above, many colonies being collected without further moving of the harvester boat 11.

Boom assembly 12 comprises floating sections 30 flexibly connected end to end. Each section 30 has an elongate floating member 31, generally covered by a water impermeable sheath 32 enclosing a buoyant material 33 such as plastic foam. Extending downwardly from each float member is a flexible sheet 34 of water resistant plastic, weighted along its bottom edge as by a metal cable 35 to hold it into vertical position in the water. The float portion may be, for example, about 8 inches in diameter, while sheet 34 may be 12 to 18 inches in height. (FIG. 4) Sheet 34 intercepts cysts which would otherwise be carried under the float member 31 and lost downwind of the boom assembly.

While some dewatering of the slurry occurs by the storage in the porous plastic bags 16, foreign matter remains. It is advantageous to next salt water wash and screen the cysts in a shore facility. The filled bags 16 are hoisted by a mechanism, not shown, to be emptied into a straining drum 41 having a coarse upper screen 42, the slurry being washed downwardly therethrough with salt water pumped from the nearby body of water. The upper screen 42 removes large debris and any dead hatched shrimp. A lower screen 43, preferably of 120 mesh size, removes the washing water, leaving the cysts in a now relatively clean slurry, which flows to a clean porous bag 16. The straining and washing drum 41 is preferably vibrated by spring mounting and the operation of an eccentrically fly wheeled motor 45. The washing brine returns to the nearby body of water via a sluice 44. (FIG. 5) Subsequently, the bags of brine washed cysts are transported to a fresh water facility for washing screening in preparation for final drying and containerization.

It is estimated that as many as 10–20 cyst colonies of average size are required to fill a single bag 16. The colonies are typically dispersed separated 50–150 feet or more apart, and the colonies are continually scattered by the wind w, traveling as fast as 5 to 10 mph. The enormous efficiency increase with the described long boom methods is readily evident from consideration of the small size of individual colonies, their wide dispersion and their rapid rate of movement. The rapid wind blown movement is in fact exploited to great advantage.

What is claimed and sought to be protected by United States Letters patent is:

1. A method of harvesting colonies of brine shrimp cysts from the upper layers of briny water, comprising the steps:

providing a floating platform in conjunction with a cyst slurry receptacle, and water permeable bags for receiving a slurry of said cyst and brine, and means for transporting the slurry from the receptacle into the bags;

providing an elongate floating boom of sufficient length to be floated simultaneously across the paths of dispersed multiple floating colonies of cysts being blown by the wind, said boom having a pair of ends, and means attaching one of said ends of the boom to the receptacle adjacent an inlet thereof;

deploying said elongate boom outwardly from the receptacle upon the surface of the body of water generally perpendicularly to currently prevailing wind, and anchoring the remaining end of the boom, rendering it substantially stationary upon the surface of the body of water;

allowing the wind to impel a multiplicity of floating shrimp colonies to and against the boom, so that further movement of said colonies in the direction of the wind is prevented;

pulling the outermost end of the boom upon the surface of the water to form an encircling enclosure about said colonies of cysts, said enclosure opening only at a cyst receiving inlet provided to the receptacle;

drawing the boom past the receptacle inlet to constrict the enclosure around the cyst colonies therein, until the cysts are concentrated into a layer of slurry of substantial thickness at the surface of the body of water at the inlet to the receptacle;

allowing the surface layer of the encircled area to flow into the receptacle; and transporting the slurry from the receptacle into the water permeable bags.

2. The method of claim 1, wherein:

the elongate boom is deployed upon the surface of the body of water using an attendant boat; and the outermost end of the boom is pulled to form the encircling enclosure by said attendant boat.

3. The method of claim 2, wherein:

the elongate floating boom is at least 300 feet in length.

4. The method of claim 2, wherein:

the means for transporting the slurry from the receptacle into the bags comprises pumping and hose means.

5. The method of claim 1, wherein:

the elongate floating boom is at least 300 feet in length.

6. The method of claim 1, wherein:

the means for transporting the slurry from the receptacle into the bags comprises pumping and hose means.

7. The method of claim 1, wherein the method further comprises;

transporting the cyst slurry containing bags to a shore facility, providing a device with a first coarse screen to remove large debris and hatched and dead shrimp, followed by a fine water removing 120 mesh screen, washing and screening said cyst slurry with said device, depositing the washed cysts into a water porous bag for transport to a second facility, washing and screening with fresh water and subsequently drying at said second facility to an uncaked condition for containerization.

8. A method of harvesting colonies of brine shrimp cysts from the upper layers of briny water, comprising the steps:

providing a floating platform in conjunction with a cyst slurry receptacle, and water permeable bags for receiving a slurry of said cyst and brine, and means for transporting the slurry from the receptacle into the bags;

providing an elongate floating boom of sufficient length to be floated simultaneously across the paths of dispersed multiple floating colonies of cysts being blown by the wind, said boom having a pair of ends;

anchoring one of said ends of the boom to the bottom of the body of water and paying out the boom from the floating platform across the path of the wind driven cysts;

attaching the other end of the boom to the receptacle adjacent an inlet thereto;

anchoring said floating platform, rendering the boom stationary upon the surface of the body of water;

allowing the wind to impel a multiplicity of floating shrimp colonies to and against the boom, so that further movement of said colonies in the direction of the wind is prevented;

forming an encircling closure about the shrimp colonies by the floating platform moving back to the anchored end of the boom;

attaching the anchored end of the boom to the receptacle;

drawing the boom past the receptacle inlet to constrict the enclosure around the cyst colonies therein, until the cysts are concentrated into a layer of slurry of substantial thickness at the surface of the body of water at the inlet to the receptacle;

allowing the surface layer of the encircled area to flow into the receptacle; and transporting the slurry from the receptacle into the water permeable bags.

9. The method of claim 8, wherein:

the elongate floating boom is at least 300 feet in length.

10. The method of claim 8, wherein:

the means for transporting the slurry from the receptacle into the bags comprises pumping and hose means.

\* \* \* \* \*